US012626868B2

(12) United States Patent
Akiba

(10) Patent No.: US 12,626,868 B2
(45) Date of Patent: May 12, 2026

(54) FILM CAPACITOR HAVING A RESIN FILM INCLUDING A CURED PRODUCT OF A FIRST ORGANIC MATERIAL AND A SECOND ORGANIC MATERIAL, AND A RESIN FILM

(71) Applicant: Murata Manufacturing Co., Ltd., Nagaokakyo (JP)

(72) Inventor: Shunsuke Akiba, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 132 days.

(21) Appl. No.: 18/734,128

(22) Filed: Jun. 5, 2024

(65) Prior Publication Data

US 2024/0321522 A1 Sep. 26, 2024

Related U.S. Application Data

(63) Continuation of application No. PCT/JP2022/040632, filed on Oct. 31, 2022.

(30) Foreign Application Priority Data

Dec. 7, 2021 (JP) ................................. 2021-198588

(51) Int. Cl.
*H01G 4/32* (2006.01)
*H01G 4/18* (2006.01)
(52) U.S. Cl.
CPC ................. *H01G 4/32* (2013.01); *H01G 4/18* (2013.01)

(58) Field of Classification Search
None
See application file for complete search history.

(56) References Cited

U.S. PATENT DOCUMENTS

| | | | | | |
|---|---|---|---|---|---|
| 3,987,348 | A | * | 10/1976 | Flanagan | ................. H01G 4/32 |
| | | | | | 361/314 |
| 9,105,408 | B2 | | 8/2015 | Ichikawa et al. | |
| 11,810,719 | B2 | | 11/2023 | Furuhashi | |

(Continued)

FOREIGN PATENT DOCUMENTS

| | | |
|---|---|---|
| JP | H05-251266 A | 9/1993 |
| JP | 2004-363431 A | 12/2004 |

(Continued)

OTHER PUBLICATIONS

International Search Report received for PCT Patent Application No. PCT/JP2022/040632, mailed on Jan. 24, 2023, 2 pages (English Translation only).

*Primary Examiner* — Eric W Thomas

(74) *Attorney, Agent, or Firm* — ArentFox Schiff LLP

(57) ABSTRACT

A film capacitor that includes: a dielectric film; and a metal layer on at least one surface of the dielectric film. The dielectric film is a resin film made of a cured product of a first organic material having multiple hydroxy groups in a molecule and a second organic material having multiple isocyanate groups in a molecule. An intensity ratio of a first peak at 1680 $cm^{-1}$ to 1770 $cm^{-1}$ derived from carbonyl groups in urethane bonds to a second peak at 1560 $cm^{-1}$ to 1620 $cm^{-1}$ derived from aromatic rings in a Fourier-transform infrared spectroscopy (FT-IR) spectrum of the resin film is 0.50 to 0.94.

16 Claims, 2 Drawing Sheets

(56) References Cited

U.S. PATENT DOCUMENTS

| 11,875,944 | B2 | 1/2024 | Akiba et al. | |
| 2014/0368970 | A1 | 12/2014 | Ichikawa et al. | |
| 2019/0006118 | A1* | 1/2019 | Will | H01G 9/145 |
| 2021/0366656 | A1 | 11/2021 | Furuhashi | |
| 2022/0102072 | A1 | 3/2022 | Inakura | |
| 2022/0122774 | A1 | 4/2022 | Akiba et al. | |

FOREIGN PATENT DOCUMENTS

| JP | 2015-181199 | A | 10/2015 | |
| WO | WO-2017175511 | A1 * | 10/2017 | H01G 4/18 |
| WO | 2020/166392 | A1 | 8/2020 | |
| WO | 2021/005822 | A1 | 1/2021 | |
| WO | 2021/005823 | A1 | 1/2021 | |

* cited by examiner

FILM CAPACITOR HAVING A RESIN FILM INCLUDING A CURED PRODUCT OF A FIRST ORGANIC MATERIAL AND A SECOND ORGANIC MATERIAL, AND A RESIN FILM

CROSS REFERENCE TO RELATED APPLICATIONS

The present application is a continuation of International application No. PCT/JP2022/040632, filed Oct. 31, 2022, which claims priority to Japanese Patent Application No. 2021-198588, filed Dec. 7, 2021, the entire contents of each of which are incorporated herein by reference.

TECHNICAL FIELD

The present description relates to film capacitors and resin films.

BACKGROUND ART

There is a type of capacitor called a film capacitor that has a structure including a flexible resin film as a dielectric material, a first opposite electrode, and a second opposite electrode opposite to the first opposite electrode across the resin film. Such a film capacitor is produced by, for example, winding or laminating a resin film on which a first opposite electrode is formed and a resin film on which a second opposite electrode is formed.

Patent Literature 1 discloses a film capacitor including a dielectric resin film and a metal layer disposed on one surface of the dielectric resin film, the dielectric resin film having a glass transition temperature of 160° C. or higher and a density at 25° C. of 1.22 g/cm$^3$ to 1.26 g/cm$^3$.

Patent Literature 1: WO 2021/005822

SUMMARY OF THE DESCRIPTION

The film capacitor disclosed in Patent Literature 1 obtains a high dielectric breakdown strength at high temperatures by controlling the density of the film to increase the glass transition temperature of the film. Patent Literature 1 describes increasing the density of the film by adjusting the solids concentration in the resin solution, which is a coating liquid. Increasing the solids concentration, however, increases the viscosity of the coating liquid. Therefore, the thinner the film to be produced, the more challenging it becomes to increase its density. As a result, increasing the dielectric breakdown strength at high temperatures becomes difficult.

The present description aims to provide a film capacitor including a resin film exhibiting a high dielectric breakdown strength at high temperatures as a dielectric film. The present description also aims to provide a resin film exhibiting a high dielectric breakdown strength at high temperatures.

The film capacitor of the present description includes: a dielectric film; and a metal layer on at least one surface of the dielectric film. The dielectric film is a resin film made of a cured product of a first organic material having multiple hydroxy groups in a molecule and a second organic material having multiple isocyanate groups in a molecule. An intensity ratio of a first peak at 1680 cm$^{-1}$ to 1770 cm$^{-1}$ derived from carbonyl groups in urethane bonds to a second peak at 1560 cm$^{-1}$ to 1620 cm$^{-1}$ derived from aromatic rings in a Fourier-transform infrared spectroscopy (FT-IR) spectrum of the resin film is 0.50 to 0.94.

The resin film of the present description is made of a cured product of a first organic material having multiple hydroxy groups in a molecule and a second organic material having multiple isocyanate groups in a molecule. An intensity ratio of a first peak at 1680 cm$^{-1}$ to 1770 cm$^{-1}$ derived from carbonyl groups in urethane bonds to a second peak at 1560 cm$^{-1}$ to 1620 cm$^{-1}$ derived from aromatic rings in a Fourier-transform infrared spectroscopy (FT-IR) spectrum of the resin film is 0.50 to 0.94.

The present description can provide a film capacitor including a resin film exhibiting a high dielectric breakdown strength at high temperatures as a dielectric film. The present description can also provide a resin film exhibiting a high dielectric breakdown strength at high temperatures.

DESCRIPTION OF THE PREFERRED EMBODIMENTS

Hereinafter, a film capacitor and a resin film of the present description are set forth.

The present description is not limited to the following features and may be suitably modified without departing from the gist of the present description. Combinations of two or more preferred features described in the following are also within the scope of the present description.

Film Capacitor

The film capacitor of the present description includes a dielectric film and a metal layer disposed on at least one surface of the dielectric film.

The film capacitor of the present description, for example, has a columnar shape whose cross section is oblong. An external terminal electrode is formed at each end in the central axis direction of the film capacitor by, for example, metal spraying (metallikon).

Hereinbelow, an embodiment of the film capacitor of the present description is set forth using as an example a wound film capacitor in which a first dielectric film on which a first metal layer is disposed and a second dielectric film on which a second metal layer is disposed are wound in a laminated state. The film capacitor of the present description may be a laminated film capacitor in which a first dielectric film on which a first metal layer is disposed and a second dielectric film on which a second metal layer is disposed are laminated. The film capacitor of the present description may also be a film capacitor in which a first dielectric film on which a first metal layer and a second metal layer are disposed and a second dielectric film on which no metal layer is disposed are wound or laminated.

Figure 1:
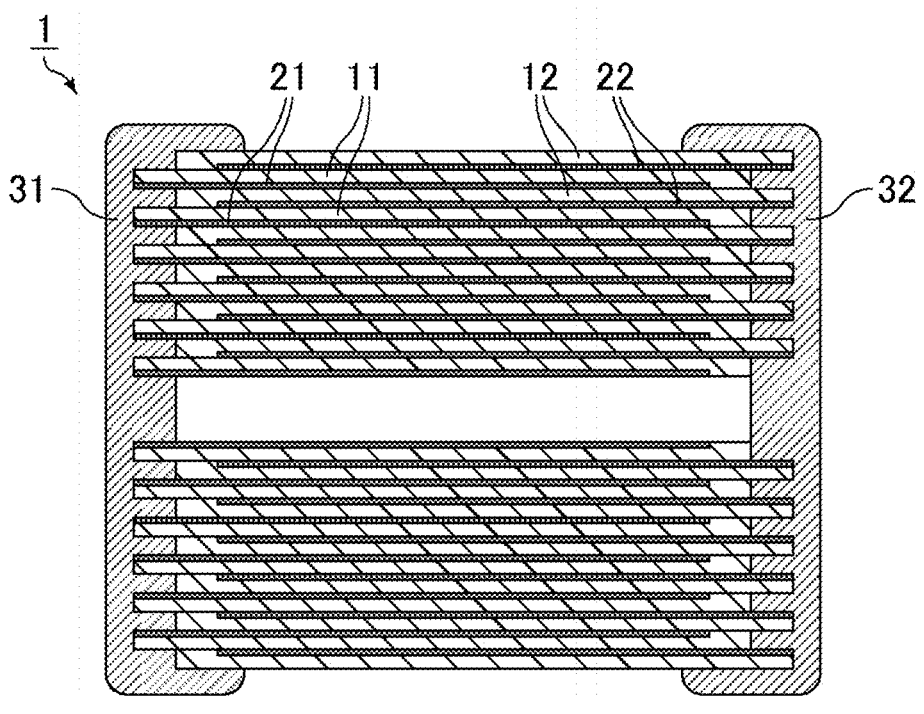
FIG. 1 is a cross-sectional view schematically showing an example of the film capacitor of the present description.

FIG. 1 is a cross-sectional view schematically showing an example of the film capacitor of the present description.

A film capacitor 1 shown in FIG. 1 is a wound film capacitor that includes a first dielectric film 11 and a second dielectric film 12 in a wound state, a first metal layer (first opposite electrode) 21 and a second metal layer (second opposite electrode) 22 opposite to each other across the first dielectric film 11 or the second dielectric film 12, a first external terminal electrode 31 electrically connected to the first metal layer 21, and a second external terminal electrode 32 electrically connected to the second metal layer 22.

The first metal layer 21 is disposed on one surface of the first dielectric film 11. The second metal layer 22 is disposed on one surface of the second dielectric film 12. The first dielectric film 11 on which the first metal layer 21 is disposed and the second dielectric film 12 on which the second metal layer 22 is disposed are wound in a laminated state to define the film capacitor 1. The second dielectric film 12 may have a different configuration from the first dielectric film 11, but preferably has the same configuration as the first dielectric film 11.

The first metal layer 21 is formed such that it reaches a first lateral edge of one surface of the first dielectric film 11 but does not reach a second lateral edge of the one surface. The second metal layer 22 is formed such that it does not reach a first lateral edge of one surface of the second dielectric film 12 but reaches a second lateral edge of the one surface. The first metal layer 21 and the second metal layer 22 are each composed of, for example, an aluminum layer.

As shown in FIG. 1, the first dielectric film 11 and the second dielectric film 12 are laminated with being shifted from each other in the width direction such that both the end of the first metal layer 21 reaching the lateral edge of the first dielectric film 11 and the end of the second metal layer 22 reaching the lateral edge of the second dielectric film 12 are exposed from the laminated films. Being wound in a laminated state, the first dielectric film 11 and the second dielectric film 12 are laminated in a state where the ends of the first metal layer 21 and the second metal layer 22 are kept being exposed.

In the film capacitor 1 shown in FIG. 1, the first dielectric film 11 and the second dielectric film 12 are wound such that the second dielectric film 12 is exterior to the first dielectric film 11 and the first metal layer 21 and the second metal layer 22 respectively disposed on the first dielectric film 11 and the second dielectric film 12 each face inward.

The first external terminal electrode 31 and the second external terminal electrode 32 are formed by thermally spraying zinc or the line on the end surfaces of the capacitor main unit obtained as described above, respectively. The first external terminal electrode 31 is in contact with the exposed end of the first metal layer 21 and is thus electrically connected to the first metal layer 21. The second external terminal electrode 32 is in contact with the exposed end of the second metal layer 22 and is thus electrically connected to the second metal layer 22.

In the film capacitor of the present description, preferably, the wound body of dielectric films is pressed to have a flat cross section such as an oval or oblong shape so that the capacitor has a more compact size than that having a perfectly circular cross section. The film capacitor of the present description may include a cylindrical winding shaft. The winding shaft is arranged along the central axis of the dielectric films in a wound state and serves as a spool for winding the dielectric films.

Examples of metals contained in the metal layers in the film capacitor of the present description include aluminum (Al), titanium (Ti), zinc (Zn), magnesium (Mg), tin (Sn), and nickel (Ni).

In the film capacitor of the present description, the thickness of each metal layer is not limited and is 5 nm to 40 nm, for example.

The thickness of the metal layer can be determined by observing a cross section of a dielectric film on which the metal layer is disposed in the thickness direction using an electron microscope such as a field emission scanning electron microscope (FE-SEM).

In the film capacitor of the present description, each metal layer preferably includes a fuse portion.

The fuse portion means a portion that connects electrode portions, formed by dividing a metal layer defining opposite electrodes, to one another. Examples of electrode patterns of the metal layer with fuse portions include those disclosed in JP 2004-363431 A and JP H5-251266 A.

In the film capacitor of the present description, the resin film of the present description is used as the dielectric film. For example, in the film capacitor 1 shown in FIG. 1, the first dielectric film 11 and the second dielectric film 12 may each be the resin film of the present description, or only one of the first dielectric film 11 and the second dielectric film 12 may be the resin film of the present description.

Resin Film

The resin film of the present description is made of a cured product of a first organic material having multiple hydroxy groups in a molecule and a second organic material having multiple isocyanate groups in a molecule. Specifically, the resin film of the present description is made of a cured product resulting from reaction between hydroxy groups (OH groups) in the first organic material and isocyanate groups (NCO groups) in the second organic material.

When the cured product is obtained by the reaction above, the resin film of the present description may contain uncured residues of the starting materials. For example, the resin film of the present description may contain at least one of hydroxy groups or isocyanate groups. In this case, the resin film of the present description may contain either hydroxy groups or isocyanate groups, or may contain both hydroxy groups and isocyanate groups.

The presence of the hydroxy groups and/or the isocyanate groups can be determined using a Fourier-transform infrared spectrophotometer (FT-IR).

In the resin film of the present description, the intensity ratio of a peak at 1680 $cm^{-1}$ to 1770 $cm^{-1}$ derived from carbonyl groups in urethane bonds to a peak at 1560 $cm^{-1}$ to 1620 $cm^{-1}$ derived from aromatic rings in a Fourier-transform infrared spectroscopy (FT-IR) spectrum is 0.50 to 0.94.

In the resin film of the present description, the intensity ratio of a peak derived from carbonyl groups to a peak derived from aromatic rings is increased, so that the dielectric breakdown strength can be increased.

The peak derived from carbonyl groups is ascribed to urethane bonds formed in reaction between hydroxy groups in the first organic material and isocyanate groups in the second organic material. Thus, the higher the intensity of the peak derived from carbonyl groups, the higher the crosslinking density. When the crosslinking density is increased, the mesh structure becomes denser to enhance the interactions between molecules. The molecules are bound together due to the interactions. A large amount of energy (heat) is required to break the binding due to the interactions. In other words, a resin film with stronger interactions between molecules is considered to have a higher glass transition temperature.

The consideration above suggests that the higher the intensity ratio of a peak derived from carbonyl groups in urethane bonds to a peak derived from aromatic rings, the more the glass transition temperature of the resin film is increased. Presumably, the increase in the glass transition temperature of the resin film improves the stability of the resin film in high-temperature regions, thus increasing the dielectric breakdown strength at high temperatures. Alternatively, an increase in the crosslinking density presumably shortens the intermolecular distance to reduce the movement of carrier ions, thus increasing the dielectric breakdown strength.

In the present description, the reaction between the first organic material and the second organic material is allowed to proceed in a solution containing the first organic material and the second organic material for production of a resin film, so that the intensity ratio of a peak derived from carbonyl groups to a peak derived from aromatic rings can be increased. Isocyanate, as the second organic material, reacts with moisture in the air or in the substrate to be coated, undergoing transformation into carbamic acid and then into an amine compound. The isocyanate after the transformation cannot react with the hydroxy groups in the first organic material, which decreases the crosslinking density to decrease the glass transition temperature and dielectric breakdown strength of the resin film.

Allowing the reaction between the first organic material and the second organic material to proceed partially in the solution limits the molecular motion, thus enhancing the reaction activation energy to reduce the deactivation by water. This presumably causes no inhibition of urethane bond formation, so that the glass transition temperature and dielectric breakdown strength of the resin film are increased.

As described above, when the intensity ratio of a peak derived from carbonyl groups to a peak derived from aromatic rings is increased, the glass transition temperature of the resin film can be increased. The glass transition temperature of the resin film of the present description is preferably 174.3° C. to 192.1° C. Thus, the resin film can be imparted with high heat resistance.

The glass transition temperature of the resin film can be calculated by measuring the storage modulus using a dynamic mechanical analyzer (DMA).

The first organic material is a polyol having multiple hydroxy groups in a molecule. The first organic material may be a combination of two or more organic materials.

The first organic material preferably has epoxy groups. Specifically, the first organic material is preferably a phenoxy resin, particularly a high-molecular-weight bisphenol A type epoxy resin with terminal epoxy groups.

The second organic material is a polyisocyanate having multiple isocyanate groups in a molecule. The second organic material reacts with the hydroxy groups in the first organic material to form a crosslinking structure, thus functioning as a curing agent which cures the film.

Examples of the second organic material include aromatic polyisocyanates such as diphenylmethane diisocyanate (MDI) and tolylene diisocyanate (or toluene diisocyanate, TDI). The second organic material may be a modified product of any of these polyisocyanates, such as a modified product having carbodiimide or urethane, for example. The MDI can be typical polymeric MDI. The MDI may also be monomeric MDI or a mixture of polymeric MDI and monomeric MDI. The TDI can be typical polymeric TDI. The TDI may also be monomeric TDI or a mixture of polymeric TDI and monomeric TDI. The second organic material may be a combination of two or more organic materials.

The resin film of the present description may contain additives for providing an additional function. For example, a leveling agent may be added to provide smoothness. A preferred additive is one having a functional group that reacts with a hydroxy group and/or an isocyanate group and capable of forming a part of the crosslinked structure of the cured product. Examples of such a material include a resin having at least one functional group selected from the group consisting of an epoxy group, a silanol group, and a carboxy group.

The thickness of the resin film of the present description is not limited. Yet, an excessively thin film tends to be fragile. The thickness of the resin film of the present description is therefore preferably 1 μm or greater, more preferably 3 μm or greater. An excessively thick film, however, tends to cause defects such as cracks during its formation. Thus, the thickness of the resin film of the present description is preferably 10 μm or smaller, more preferably 5 μm or smaller.

The thickness of the film means the thickness of the film alone excluding the thickness of the metal layer. The thickness of the film can be measured with an optical film thickness gauge.

Method of Producing Resin Film

The resin film of the present description is preferably obtained by forming a film from a resin solution containing a first organic material and a second organic material and curing the film by heat treatment.

The resin solution is produced by, for example, dissolving the first organic material and the second organic material described above in a solvent, followed by mixing, and then adding an additive (s) as appropriate. The cured film may contain the residues of the solvent in the resin solution.

As described above, when the reaction between the first organic material and the second organic material is allowed to proceed partially in the resin solution, the intensity ratio of a peak derived from carbonyl groups to a peak derived from aromatic rings can be increased.

Preferably, the first organic material and the second organic material are reacted in the resin solution while being heated with stirring to increase the reaction speed. A catalyst or the like may also be used to increase the reaction speed.

The first organic material and the second organic material may be reacted in a resin solution by any method such as, for example, high-pressure homogenization, mechanical homogenization, or ultrasonic homogenization.

The weight ratio of the first organic material to the second organic material (first organic material/second organic material) is not limited and may be, for example, 10/90 to 90/10.

The solvent is preferably a mixed solvent containing a first solvent selected from ketones and a second solvent selected from cyclic ether compounds. Examples of the ketones include methyl ethyl ketone and diethyl ketone. Examples of cyclic ether compounds include tetrahydrofuran and tetrahydropyran. The weight ratio of the first solvent to the second solvent (first solvent/second solvent) is not limited and may be, for example, 15/85 to 85/15.

Method of Producing Film Capacitor

Next, an example of the method of producing the film capacitor of the present description is set forth.

First, a metal layer is formed on one surface of the resin film of the present description used as a dielectric film to obtain a metalized film. The method of forming a metal layer may be vapor deposition, for example.

Two metalized films each with a metal layer formed on one surface of its dielectric film are laminated in a state where they are shifted by a predetermined distance from each other in the width direction, followed by winding. Thus, a laminate is obtained. The laminate may be sandwiched from directions perpendicular to the width direction and pressed into an oval cylindrical shape as appropriate.

Subsequently, external terminal electrodes are formed on the end surfaces of the laminate, whereby a film capacitor as shown in FIG. 1 can be obtained. The method of forming external terminal electrodes on the end surfaces of the laminate include thermal spraying.

EXAMPLES

Examples that more specifically disclose the resin film of the present description are set forth below. The present description is not limited to these examples.
Samples 1 to 8
Phenoxy resin was prepared as the first organic material. 4,4-Diphenylmethane diisocyanate (MDI) was prepared as the second organic material.

The phenoxy resin was a high-molecular-weight bisphenol A type epoxy resin having terminal epoxy groups.

The MDI was typical polymeric MDI or monomeric MDI. In a development example, a mixture of polymeric MDI and monomeric MDI may be used.

The first organic material and the second organic material were diluted and mixed in a mixed solvent containing methyl ethyl ketone (MEK) and tetrahydrofuran (THF) to obtain a primary solution. The first organic material and the second organic material were reacted while the obtained primary solution was stirred, so that a secondary solution was obtained. The reaction rate between the first organic material and the second organic material was taken as the reaction rate of each secondary solution.

The reaction between the first organic material and the second organic material is preferably performed with heating and stirring to increase the reaction speed. A catalyst or the like may also be used to increase the reaction speed.

The secondary solution may be reacted by any method such as, for example, high-pressure homogenization, mechanical homogenization, or ultrasonic homogenization.

In the present example, the mixed solvent of MEK and THE was used, but the type of solvent is not limited.

The solvent is preferably one dehydrated in advance by distillation or with a dehydrating agent or the like.

In the present example, the stirring duration for the primary solution was adjusted to the duration shown in Table 1 such that the reaction rate of the secondary solution was controlled to be about 0% to 35%.

The obtained secondary solution was applied to a PET film with a doctor blade coater, followed by drying the solvent, so that an uncured film with a thickness of 3 µm was obtained. The film was then treated for four hours in a convection oven set to 150° C. to be thermally cured into a cured film. Samples 1 to 8 were thereby obtained.
Samples 9 to 15
Phenoxy resin was prepared as the first organic material. Tolylene diisocyanate (TDI) was prepared as the second organic material.

The phenoxy resin was a high-molecular-weight bisphenol A type epoxy resin having terminal epoxy groups.

The TDI was typical polymeric TDI or monomeric TDI. In a development example, a mixture of polymeric TDI and monomeric TDI may be used.

The first organic material and the second organic material were diluted and mixed in a mixed solvent containing MEK and THE to obtain a primary solution. The first organic material and the second organic material were reacted while the obtained primary solution was stirred, so that a secondary solution was obtained. The reaction rate between the first organic material and the second organic material was taken as the reaction rate of the secondary solution.

The reaction between the first organic material and the second organic material is preferably performed with heating and stirring to increase the reaction speed. A catalyst or the like may also be used to increase the reaction speed.

The secondary solution may be reacted by any method such as, for example, high-pressure homogenization, mechanical homogenization, or ultrasonic homogenization.

In the present example, the mixed solvent of MEK and THF was used, but the type of solvent is not limited.

The solvent is preferably one dehydrated in advance by distillation or with a dehydrating agent or the like.

In the present example, the stirring duration for the primary solution was adjusted to the duration shown in Table 2 such that the reaction rate of the secondary solution was controlled to be about 0% to 30%.

The obtained secondary solution was applied to a PET film with a doctor blade coater, followed by drying the solvent, so that an uncured film with a thickness of 3 µm was obtained. The film was then treated for four hours in a convection oven set to 150° C. to be thermally cured into a cured film. Samples 9 to 15 were thereby obtained.
Reaction Rate of Secondary Solution The reaction rates of the secondary solutions produced under different conditions were calculated by the method below.

Each of the produced secondary solutions was applied for film formation and dried at 70° C. for one minute. The FT-IR spectral analysis was conducted on the dried surface of the obtained film to calculate the intensity ratio of a peak at 2200 cm$^{-1}$ to 2350 cm$^{-1}$ derived from isocyanate groups to a peak at 1590 cm$^{-1}$ to 1620 cm$^{-1}$ derived from aromatic rings. A percentage decrease of the above intensity ratio from a reference intensity ratio, which was the intensity ratio of a film produced using an unreacted secondary solution, was used to calculate the reaction rate of the secondary solution.

Figure 2:
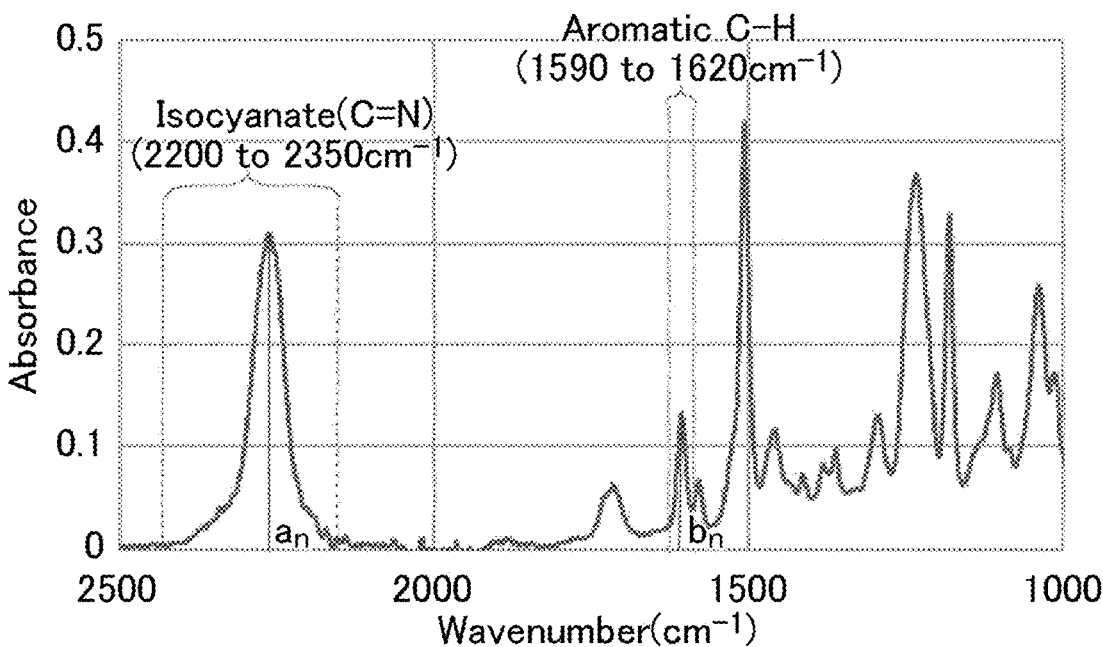
FIG. 2 shows an example of an FT-IR spectrum for calculation of the intensity ratio of a peak derived from isocyanate groups to a peak derived from aromatic rings.

FIG. 2 shows an example of an FT-IR spectrum for calculation of the intensity ratio of a peak derived from isocyanate groups to a peak derived from aromatic rings. In FIG. 2, $a_n$ indicates the peak intensity at 2200 cm$^{-1}$ to 2350 cm$^{-1}$ derived from isocyanate groups, and $b_n$ indicates the peak intensity at 1590 cm$^{-1}$ to 1620 cm$^{-1}$ derived from aromatic rings.

The reaction rates of the secondary solutions are determined from the formulas below, wherein $a_o$ represents the peak intensity at 2200 cm$^{-1}$ to 2350 cm$^{-1}$ derived from isocyanate groups and $b_o$ represents the peak intensity at 1590 cm$^{-1}$ to 1620 cm$^{-1}$ derived from aromatic rings, the peak intensities being obtained by analysis on the film produced using an unreacted secondary solution. Table 1 and Table 2 show the reaction rates.

$$\text{Reaction rate (\%) of secondary solution} = \left\{ (A_0 - A_n)/A_0 \right\} \times 100$$

$$A_n = a_n/b_n$$

$$A_0 = a_0/b_0$$

Intensity Ratio of Peak Derived from Carbonyl Groups to Peak Derived from Aromatic Rings The FT-IR spectrum analysis was conducted on the dried surface of each cured film to calculate the intensity ratio of a peak at 1680 cm$^{-1}$ to 1770 cm$^{-1}$ derived from carbonyl groups in urethane bonds to a peak at 1560 cm$^{-1}$ to 1620 cm$^{-1}$ derived from aromatic rings.

Figure 3:
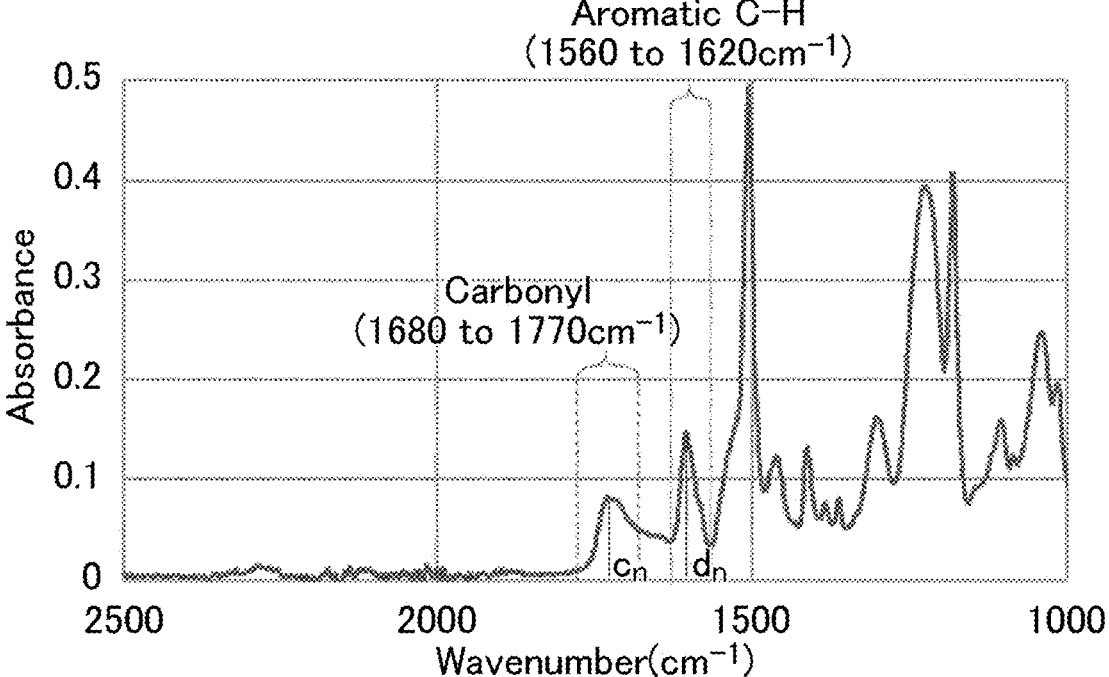
FIG. 3 shows an example of an FT-IR spectrum for calculation of the intensity ratio of a peak derived from carbonyl groups to a peak derived from aromatic rings.

FIG. 3 shows an example of an FT-IR spectrum for calculation of the intensity ratio of a peak derived from carbonyl groups to a peak derived from aromatic rings. In FIG. 3, $C_n$ indicates the peak intensity at 1680 cm$^{-1}$ to 1770 cm$^{-1}$ derived from carbonyl groups in urethane bonds and $d_n$ indicates the peak intensity at 1560 cm$^{-1}$ to 1620 cm$^{-1}$ derived from aromatic rings. Table 1 and Table 2 show the peak intensity ratios $C_n/d_n$ (carbonyl groups/aromatic rings).

The FT-IR spectrum analysis was conducted by analyzing the infrared absorption spectrum of each resin film using a Fourier-transform infrared spectrophotometer by attenuated total reflection (ATR). The wavenumber range was 500 cm$^{-1}$ to 4000 cm$^{-1}$. The analysis was conducted using "FT/IR-4100ST" available from JASCO Corporation. The ATR crystal was ZnSe crystal. The angle of incidence was 45°. The number of accumulations was 16 times. The resolution was 4 cm$^{-1}$.

Glass Transition Temperature

Each film was fixed to have a size of 5 mm in width×6 mm in length. The storage modulus of the film was measured using a dynamic mechanical analyzer RSA3 (available from TA Instruments Japan Inc.). The measurement was performed while the temperature was increased from 40° C. to 250° C. at 20° C./min.

Figure 4:
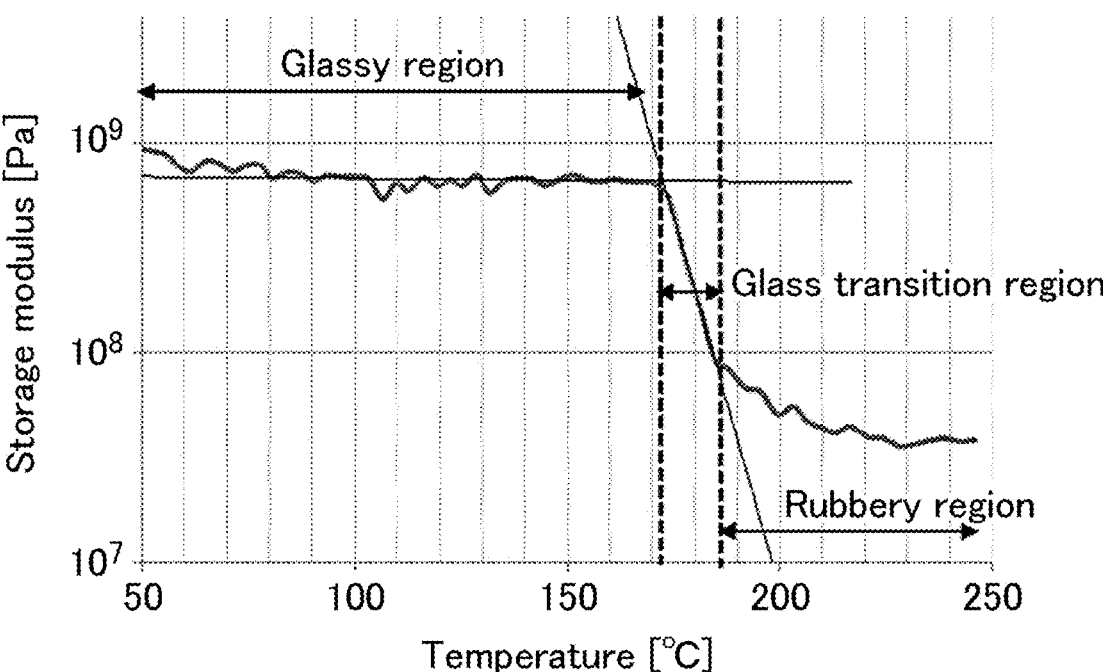
FIG. 4 shows an example of a storage modulus measurement result of a film.

FIG. 4 shows an example of a storage modulus measurement result of a film. The temperature at which transition from the glassy region to the glass transition region occurred was taken as a glass transition temperature. Specifically, tangent lines were drawn respectively on the glassy region part and glass transition region part of the graph and the intersection of the tangent lines was taken as the glass transition temperature. Table 1 and Table 2 show the glass transition temperatures of the films.

Dielectric Breakdown Strength

Each film was peeled from the PET film, and electrodes were formed on both surfaces of the film by aluminum deposition (the electrode area of the overlapping portion was 30 cm$^2$) to prepare a specimen for evaluation. Voltage was applied to the produced specimen at 100 V/μm for 10 minutes. The voltage was then increased in increments of 25 V/μm. The voltage was held for 10 minutes after each increment. The electric field strength was recorded every time the film suffered a breakage. The measurement was continued until a breakage occurred at a total of 16 sites. A Weibull plot was formed based on the recorded results, and a value corresponding to a failure rate of 50% was taken as the dielectric breakdown strength. During the measurement, the ambient temperature of the film was set to 125° C. Table 1 and Table 2 show the dielectric breakdown strengths of the films.

TABLE 1

| Sample | Stirring duration [hr] | Reaction rate of secondary solution [%] | Peak intensity ratio (carbonyl groups/aromatic rings) | Glass transition temperature [° C.] | Dielectric breakdown strength [V/μm] |
|---|---|---|---|---|---|
| 1 * | 0 | 0 | 0.41 | 165.2 | 375 |
| 2 * | 1 | 3 | 0.44 | 168.1 | 400 |
| 3 | 2 | 7 | 0.50 | 174.3 | 425 |
| 4 | 4 | 12 | 0.61 | 177.2 | 425 |
| 5 | 6 | 17 | 0.70 | 181.7 | 450 |
| 6 | 8 | 25 | 0.86 | 186.9 | 475 |
| 7 | 12 | 30 | 0.94 | 192.1 | 475 |
| 8 * | 15 | 37 | — | — | — |

TABLE 2

| Sample | Stirring duration [hr] | Reaction rate of secondary solution [%] | Peak intensity ratio (carbonyl groups/aromatic rings) | Glass transition temperature [° C.] | Dielectric breakdown strength [V/μm] |
|---|---|---|---|---|---|
| 9 * | 0 | 0 | 0.42 | 166.8 | 375 |
| 10 * | 1 | 4 | 0.47 | 170.4 | 400 |
| 11 | 2 | 8 | 0.52 | 175.1 | 425 |
| 12 | 4 | 12 | 0.62 | 177.3 | 425 |
| 13 | 6 | 16 | 0.73 | 180.7 | 450 |
| 14 | 8 | 23 | 0.84 | 186.1 | 475 |
| 15 * | 12 | 29 | — | — | — |

In Table 1 and Table 2, samples marked with "*" are comparative examples that are out of the scope of the present description.

The samples 8 and 15 failed to form a film as a result of gelling of the solution due to excessive reaction between the first organic material and the second organic material in the solution.

Table 1 and Table 2 demonstrate that as the intensity ratio of a peak at 1680 cm$^{-1}$ to 1770 cm$^{-1}$ derived from carbonyl groups in urethane bonds to a peak at 1560 cm$^{-1}$ to 1620 cm$^{-1}$ derived from aromatic rings in a FT-IR spectrum increases, the glass transition temperature increases to lead to a high dielectric breakdown strength.

As with the samples 1, 2, 9, and 10, when the intensity ratio of a peak derived from carbonyl groups in urethane bonds to a peak derived from aromatic rings is 0.41 to 0.47, the glass transition temperature of the film is as low as 165.2° C. to 170.4° C. and the dielectric breakdown strength is as low as 375 V/μm to 400 V/μm.

In contrast, the results of the samples 3 to 7 and 11 to 14 show that when the intensity ratio of a peak derived from carbonyl groups in urethane bonds to a peak derived from aromatic rings is 0.50 to 0.94, the glass transition temperature of the film is as very high as 174.3° C. to 192.1° C. and the dielectric breakdown strength is as high as 425 V/μm to 475 V/μm. Thus, the film exhibits excellent heat resistance and excellent withstand voltage.

REFERENCE SIGNS LIST

1 film capacitor
11 first dielectric film
12 second dielectric film
21 first metal layer
22 second metal layer
31 first external terminal electrode
32 second external terminal electrode

The invention claimed is:

1. A film capacitor comprising:
a dielectric film; and
a metal layer on at least one surface of the dielectric film,
wherein the dielectric film is a resin film made of a cured product of a first organic material having multiple hydroxy groups in a first molecule and a second organic material having multiple isocyanate groups in a second molecule, and
an intensity ratio of a first peak at 1680 cm$^{-1}$ to 1770 cm$^{-1}$ derived from carbonyl groups in urethane bonds to a second peak at 1560 cm$^{-1}$ to 1620 cm$^{-1}$ derived from aromatic rings in a Fourier-transform infrared spectroscopy (FT-IR) spectrum of the resin film is 0.50 to 0.94.

2. The film capacitor according to claim 1, wherein a glass transition temperature of the resin film is 174.3° C. to 192.1° C.

3. The film capacitor according to claim 1, wherein the first organic material includes epoxy groups.

4. The film capacitor according to claim 1, wherein the first organic material is a phenoxy resin.

5. The film capacitor according to claim 1, wherein the second organic material includes an aromatic polyisocyanate.

6. The film capacitor according to claim 1, wherein the second organic material includes a diphenylmethane diisocyanate.

7. The film capacitor according to claim 1, wherein the second organic material includes a tolylene diisocyanate.

8. The film capacitor according to claim 1, wherein a thickness of the resin film is 1 μm to 10 μm.

9. A resin film comprising:
a cured product of a first organic material having multiple hydroxy groups in a first molecule and a second organic material having multiple isocyanate groups in a second molecule,
wherein an intensity ratio of a first peak at 1680 cm$^{-1}$ to 1770 cm$^{-1}$ derived from carbonyl groups in urethane bonds to a second peak at 1560 cm$^{-1}$ to 1620 cm$^{-1}$ derived from aromatic rings in a Fourier-transform infrared spectroscopy (FT-IR) spectrum of the resin film is 0.50 to 0.94.

10. The resin film according to claim 9, wherein a glass transition temperature of the resin film is 174.3° C. to 192.1° C.

11. The resin film according to claim 9, wherein the first organic material includes also has epoxy groups.

12. The resin film according to claim 9, wherein the first organic material is a phenoxy resin.

13. The resin film according to claim 9, wherein the second organic material includes an aromatic polyisocyanate.

14. The resin film according to claim 9, wherein the second organic material includes a diphenylmethane diisocyanate.

15. The resin film according to claim 9, wherein the second organic material includes a tolylene diisocyanate.

16. The resin film according to claim 9, wherein a thickness of the resin film is 1 μm to 10 μm.

* * * * *